United States Patent [19]

Tilly et al.

[11] Patent Number: 4,482,188

[45] Date of Patent: Nov. 13, 1984

[54] ANCHORAGE FOR A SEAT MOUNTED SEAT BELT

[75] Inventors: Thomas Tilly, Fair Haven; Lloyd W. Rogers, Jr., Utica, both of Mich.

[73] Assignee: General Motors Corporation, Detroit, Mich.

[21] Appl. No.: 445,910

[22] Filed: Dec. 1, 1982

[51] Int. Cl.³ ........................ A62B 35/00; A47C 31/00

[52] U.S. Cl. .................................... 297/473; 248/412; 248/429; 248/393; 280/801; 297/468

[58] Field of Search ............... 297/468, 473, 479, 470, 297/216; 280/801, 806; 248/429, 424, 393, 394, 395, 412; 308/3 R

[56] References Cited

U.S. PATENT DOCUMENTS

| | | | |
|---|---|---|---|
| 461,238 | 10/1891 | Cox et al. | 248/412 |
| 1,103,839 | 7/1914 | Rellay | 248/412 |
| 3,186,760 | 6/1965 | Lohr et al. | 297/470 X |
| 3,207,554 | 9/1965 | Dall | 248/429 X |
| 3,445,143 | 5/1969 | Swenson | 248/429 X |
| 3,727,977 | 4/1973 | Gmeiner | 297/468 X |
| 3,746,393 | 7/1973 | Andres et al. | 297/468 |
| 3,756,094 | 9/1973 | Mauron | 248/429 X |
| 3,845,987 | 11/1974 | Bashford | 248/393 X |
| 3,977,725 | 8/1976 | Tengler | 248/393 X |
| 4,072,347 | 2/1978 | Boisset | 248/429 |
| 4,225,184 | 9/1980 | Strowick | 248/393 X |
| 4,229,041 | 10/1980 | Werner | 248/393 X |
| 4,248,480 | 2/1981 | Koucky et al. | 297/468 |
| 4,262,963 | 4/1981 | Bauer et al. | 248/429 |
| 4,381,096 | 4/1983 | Roper | 248/429 |

FOREIGN PATENT DOCUMENTS

| | | | |
|---|---|---|---|
| 2802617 | 7/1979 | Fed. Rep. of Germany | 297/473 |
| 1360781 | 4/1964 | France | 297/473 |

OTHER PUBLICATIONS

"Deal Slide Locks"; Brochure by Deal Slide Locks, Incorporated; Dec. 1955.

*Primary Examiner*—James T. McCall
*Attorney, Agent, or Firm*—Charles E. Leahy

[57] ABSTRACT

A vehicle seat is mounted on the vehicle floor by a seat adjusting mechanism permitting fore and aft adjusting movement of the seat. A channel member is connected to the vehicle floor behind the seat and extends forwardly along the path of longitudinal seat adjustment movement. The channel member has opposed facing walls which are slidably engaged by a pair of wedge members having associated ramp surfaces. A seat belt is connected to the rearward one of the wedge members so that an occupant restraint load imposed upon the seat belt induces longitudinal forward movement of the rearward wedge member into locking engagement with the forward wedge member and the walls of the channel member so that the seat belt is fixed relative to the channel member and the occupant restraint load is transmitted through the channel member to the vehicle floor. A lost motion connection selectively and alternately connects the seat with the forward wedge member upon forward seat adjusting movement and with the rearward wedge upon rearward seat adjusting movement to establish the wedge members in non-locking positions relative the channel member and thereby enable longitudinal adjusting movement of the wedge member and the seat belt with the seat so that the seat belt is always carried at a certain position relative to the vehicle seat notwithstanding adjustment of the seat relative to the vehicle floor.

3 Claims, 6 Drawing Figures

ANCHORAGE FOR A SEAT MOUNTED SEAT BELT

The invention relates to a seat belt anchorage system enabling the mounting of a restraint belt on a vehicle seat by transmitting the seat belt loads to the vehicle floor without imposing the belt load upon the seat adjusting mechanism.

BACKGROUND OF THE INVENTION

Conventional seat belt systems have a belt end mounted inboard the occupant seating position. For example, a buckle is mounted inboard the occupant seating position for engagement by a mating latch plate provided upon a belt mounted outboard the occupant seating position. Engagement of the latch plate with the buckle disposes the seat belt across the body of the seated occupant for restraining the occupant against movement from the seat.

Conventional vehicle seats may be a bucket seat or a bench seat and are mounted on the vehicle floor by a seat adjusting mechanism. Such seat adjusting mechanisms may enable fore and aft adjusting movement of the seat or, additionally, may provide vertical adjustment and tilting of the seat as well as fore and aft adjusting movement.

It would be desirable to mount the inboard buckle directly on the vehicle seat so that the position of the buckle relative the seated occupant remains unchanged as the position of the seat is adjusted by the seat adjusting mechanism. However, mounting of the buckle directly on the seat has a disadvantage of requiring that the seat adjustment mechanism be strong enough to maintain the seat against movement by the momentum of the seated occupant which is transferred to the seat by the seat belt system.

Accordingly, it is desirable to provide an anchorage system which acts between the seat mounted restraint belt buckle and the vehicle floor to transmit the occupant restraint load to the vehicle floor without relying upon the force sustaining capability of the seat adjusting mechanism.

SUMMARY OF THE INVENTION

According to the invention, a vehicle seat is mounted on the vehicle floor by a seat adjusting mechanism permitting fore and aft adjusting movement of the seat. A channel member is connected to the vehicle floor behind the seat and extends forwardly along the path of longitudinal seat adjusting movement. The channel member has opposed facing walls which are slidably engaged by a pair of wedge members having associated ramp surfaces. A seat belt is connected to the rearward one of the wedge members so that an occupant restraint load imposed upon the seat belt induces longitudinal forward movement of the rearward wedge member into locking engagement with the forward wedge member and the walls of the channel member so that the seat belt is fixed relative to the channel member and the occupant restraint load is transmitted through the channel member to the vehicle floor. A lost motion connection selectively and alternately connects the seat with the forward wedge member upon forward seat adjusting movement and with the rearward wedge upon rearward seat adjusting movement to establish the wedge members in nonlocking positions relative the channel member and thereby enable longitudinal adjusting movement of the wedge member and the seat belt with the seat so that the seat belt is always carried at a certain position relative to the vehicle seat notwithstanding adjustment of the seat relative to the vehicle floor.

BRIEF DESCRIPTION OF THE DRAWINGS

These and other features, objects and advantages of the invention will become apparent upon consideration of the specification and the drawings in which:

FIG. 4 is a sectional view taken in the direction of arrows 4—4 of FIG. 2;

DESCRIPTION OF THE PREFERRED EMBODIMENT

Figure 1:
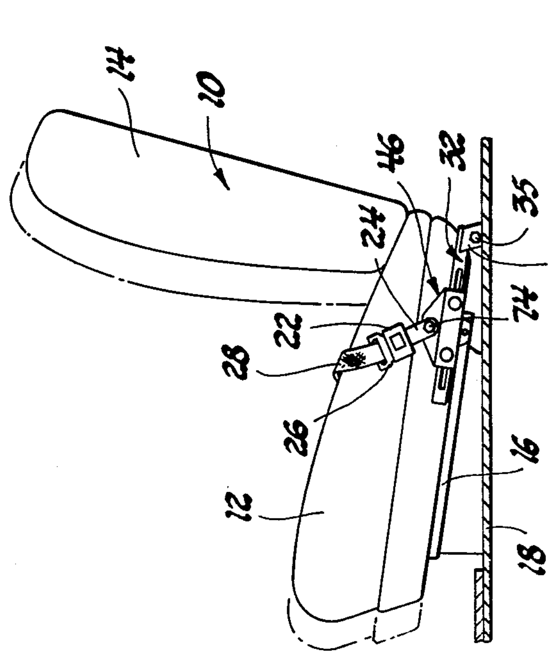
FIG. 1 is a side elevation view of the vehicle seat employing the invention.
Figure 7:
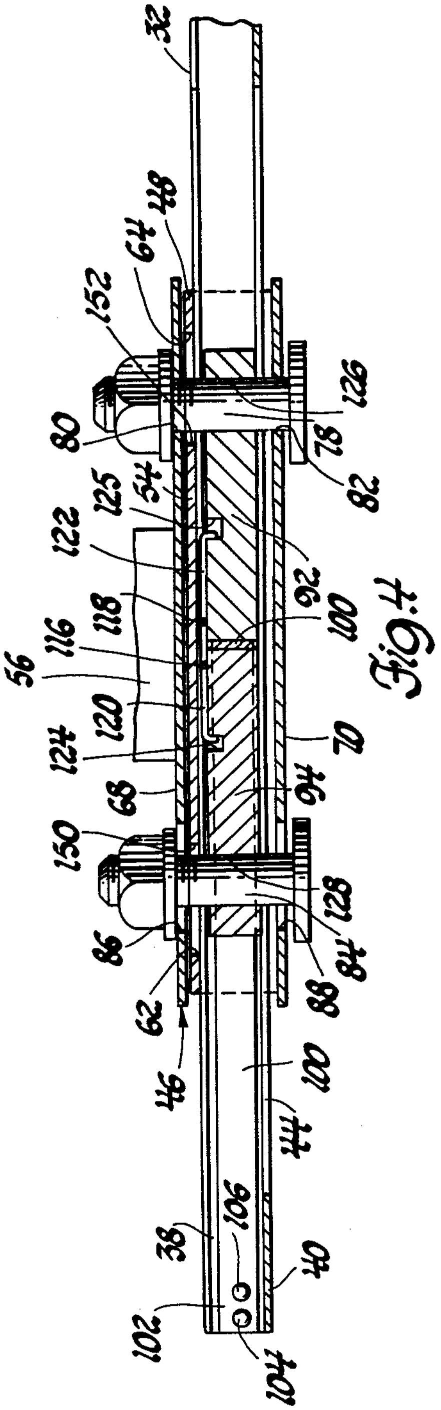
Figure 6:
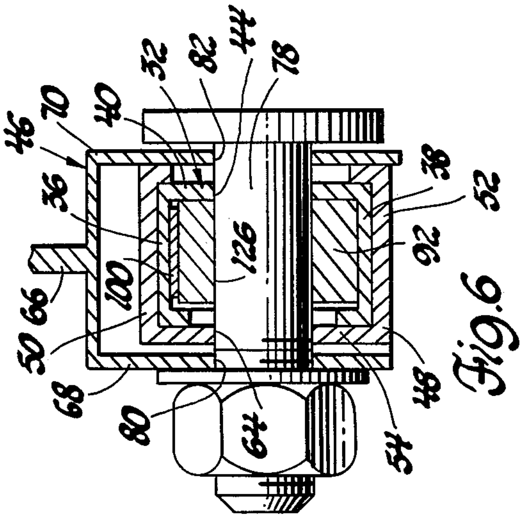
FIG. 6 is a sectional view taken in the direction of arrows 6—6 of FIG. 2.

Referring to FIG. 1 there is shown a vehicle seat generally indicated at 10 and including a seat bottom 12 and a seat back 14. The seat bottom has a frame 16 which is conventionally mounted for adjusting movement relative to the vehicle floor 18 by a seat adjusting mechanism, not shown. The seat adjusting mechanism may be of the type which moves the seat 10 fore and aft or may be a six-way seat adjuster which tilts the seat vertically as well as moves the seat fore and aft.

A buckle 22 and anchor bracket 24 are provided for selective engagement by a latch plate 26 connected to an occupant restraint belt 28. The anchor bracket 24 of the buckle 22 is mounted upon the seat for adjusting movement therewith by an anchorage mechanism to be described hereinafter.

Figure 3:
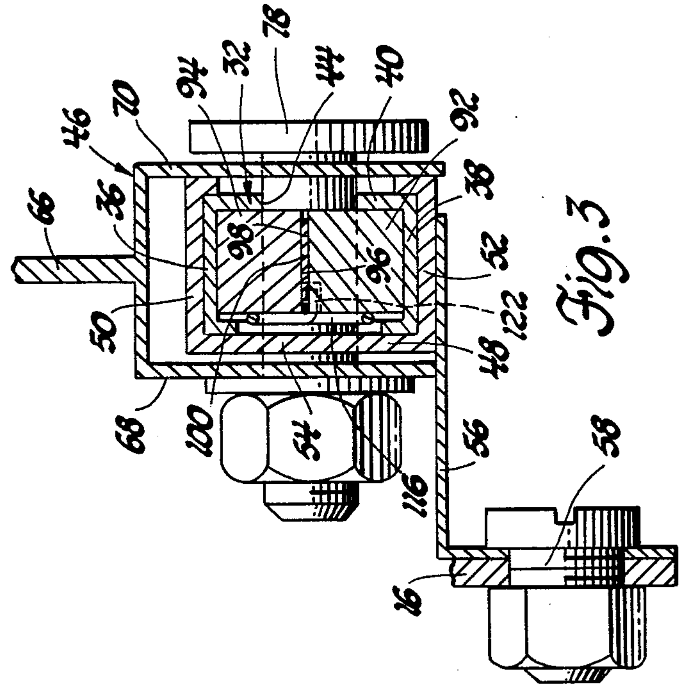
FIG. 3 is a sectional view taken in the direction of arrows 3—3 of FIG. 2.
Figure 2:
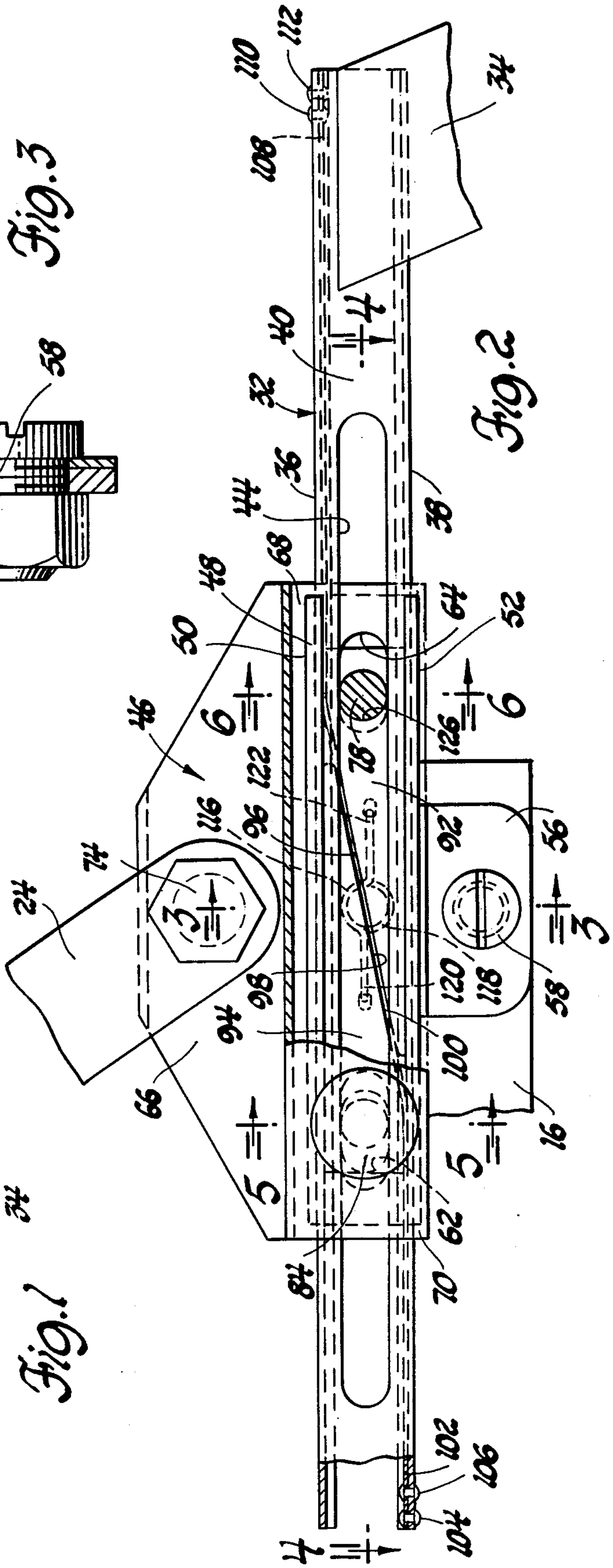
FIG. 2 is a side elevation view of the anchorage mechanism having parts broken away in sections.

Referring to FIGS. 1 and 2, it is seen that a channel member 32 extends in a parallel path alongside the seat bottom frame 16. The rear end of the channel member 32 is suitably attached as by welding to a bracket 34 which is pivotally mounted on the vehicle floor by a pivot bolt 35. As best seen in FIG. 3, the channel member 32 has spaced apart opposed facing top and bottom walls 36 and 38 which are connected by a web 40. The web 40 has an elongated slot 44.

A carriage assembly, generally indicated at 46, is slidable along the channel member 32 and includes a channel 48 which is slidable upon the outside of the channel member 32. The channel 48 includes top and bottom walls 50 and 52 connected by a web 54. The channel 48 is mounted upon the seat bottom frame 16 by a mounting bracket 56 and nut and bolt assembly 58 so that the channel 48 is carried fore and aft along the channel member 32 during fore and aft adjusting movement of the seat 10. The web 54 of seat mounted channel 48 has a pair of longitudinally spaced apart elongated slots 62 and 64.

Carriage assembly 46 also includes a belt bracket 66 having spaced apart legs 68 and 70 which straddle the channel 48. The buckle anchor bracket 24 is attached to the belt bracket 66 by a bolt 74 so that the belt bracket 66 is urged forwardly relative the channel member 32 and channel 48 by an occupant restraint load imposed upon the belt.

The carriage assembly 46 also includes a pair of front and rear wedge members 92 and 94 which are positioned within the channel member 32 and have inclined surfaces 96 and 98 which face one another. A stainless steel ribbon 100 extends between the inclined surfaces 96 and 98 of the wedge members 92 and 94. One end 102 of the ribbon 100 is connected to the bottom wall 38 of the channel member 32 by rivets 104 and 106. The other end 108 of the ribbon 100 is likewise attached to the upper wall 36 at the other end of the channel member 32 by rivets 110 and 112. A connecting spring 116 acts between the wedge members 92 and 94. The spring 116 includes a central coil portion 118 and a pair of legs 120 and 122 which extend into oversize anchor apertures 124 and 125 of the wedge members 92 and 94.

As best seen in FIG. 4, a bolt 78 extends through aligned circular holes 80 and 82 of the belt bracket legs 68 and 70 and through a circular hole 126 in the rear wedge member 92 so that the wedge member 92 will be moved in unison with the belt bracket 66 upon imposition of an occupant restraint load on the restraint belt 28 connected to the anchor bracket 24 by the buckle 22. The web 54 of the seat mounted channel 48 has an elongated aperture 64 which permits a lost motion movement of the bolt 78 with the belt brackets 66 and wedge member 92 relative to the seat mounted channel 48.

Figure 5:
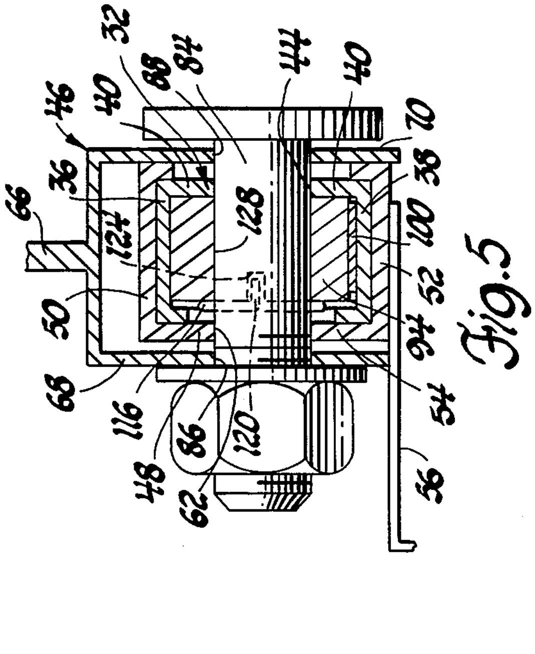
FIG. 5 is a sectional view taken in the direction of arrows 5—5 of FIG. 2.

Referring again to FIGS. 4 and 5 it is seen that a bolt 84 extends through a circular hole 128 in the front wedge member 94, through aligned elongated apertures 86 and 88 of the belt bracket legs 68 and 70, through elongated aperture 62 of the seat mounted channel 54, and through the elongated aperture 44 of the web floor mounted channel web 40 to permit movement of the front wedge member 94 relative to the belt bracket 66, the seat mounted channel 48 and the floor connected channel 32.

OPERATION

In the event that an occupant restraint load is imposed upon the occupant restraint belt 28, the restraint load is transmitted through the buckle 22 and the buckle bracket 24 to the belt bracket 66. The forward movement of belt bracket 66 induces forward movement of the bolt 78 and the wedge member 92. This forward movement of the wedge member 92 causes its inclined surface 96 to move forwardly and, acting through the interposition of stainless steel ribbon 100, to spread the forward wedge member 94 upwardly. Accordingly, the wedge members 92 and 94 are wedged into respective frictional locking engagement with the lower wall 38 and top wall 36 of the floor connected channel member 32 so that the seat belt load is transmitted from the belt bracket 66 to the floor connected channel member 32 via the wedge members 92 and 94. The elongated apertures 60 and 62 prevent the belt load from being imposed through the bolts 78 and 84 into the seat connected channel 48. Accordingly, the occupant restraint load is transmitted to the vehicle floor through the floor connected channel member 32 and it is not transmitted into the seat bottom frame 16 and the seat adjusting mechanism.

Upon termination of the occupant restraint load, the wedging force upon the wedge members 92 and 94 are terminated and the interposition of the stainless steel ribbon 100 therebetween assures that the friction force between the wedge members and the floor connected channel 32 are also relaxed to enable normal fore and aft adjustment of the seat via the seat adjusting mechanism.

During such adjusting movement of the seat by the seat adjuster, the seat mounted channel 48 is moved fore and aft by the mounting bracket 56. During such fore and aft movement of the channel 54 with the seat 10, the belt bracket 66 and the wedge members 92 and 94 move back and forth in unison with the seat connected channel 54 and relative to the floor connected channel member 32. Accordingly, the position of the belt buckle 22 remains consistent relative the seated occupant irrespective of fore and aft adjustment movement of the seat.

As best seen in FIG. 4, the rearward wall 150 of the elongated aperture 62 in the web 54 of seat mounted channel 48 is closely spaced to the bolt 84 so that the initial forward movement of the seat mounted channel 48 will cause the wall 150 to engage the bolt 84 and assure that the wedge member 94 is carried forwardly with the seat and ahead of the rear wedge member 92 so that the wedge members will not lock the carriage 52 against movement along the floor connected channel member 32. Likewise, the forward wall 152 of the elongated aperture 64 is closely spaced to the bolt 78 so that an initial rearward adjusting movement of the seat mounted channel 48 with the seat 10 will cause the channel 48 to engage with the bolt 78 and assure that the rear wedge member 92 is carried rearwardly in advance of the front wedge member 94 to assure that the wedge members do not lock the carriage assembly 52 against rearward movement along the floor connected channel member 32.

It will be understood that the connecting spring 116 functions to tow one of the wedge members behind the other during the fore and aft adjusting movement of the seat. However, the connecting spring 116 may be eliminated if the length of the elongated apertures 62 and 64 is precisely controlled to assure that the spacing between the wedge members 92 and 94 is sufficiently controlled to assure that the wedge members are in close proximity with the stainless steel ribbon 100 to assure consistent and reliable ramping action between the wedge members upon transmission of an occupant restraint load thereto via the belt anchor bracket 66.

As is best seen in FIG. 3, it will be understood that the spreading apart action of the wedge members 92 and 94 during the imposition of an occupant restraint load thereon will impose forces attempting to spread apart the top wall 36 and bottom wall 38 of the floor connected channel 32. Any such spreading apart action is prevented by the depicted arrangement of the seat connected channel 48 so that its top wall 50 and bottom wall 52 slidably engage with the top and bottom walls 36 and 38 of the channel 32 and the web 54 of the seat connected channel 48 captures the channel 32 against being spread apart.

Referring again to FIG. 1 it will be understood that the pivot bolt 35 connecting the channel member 32 with the vehicle floor 18 permits the seat 10 to be adjusted vertically or tilted relative the floor and those vehicles equipped with a six-way seat adjuster.

Furthermore, it will be understood although the invention is disclosed herein as having rectangular channel sections forming the floor connected and seat connected interslidable members, these members could be tubular or any other structural shape.

Thus it is seen that the invention provides an anchorage system which acts between the seat mounted restraint belt buckle and the vehicle floor to transmit the occupant restraint load to the vehicle floor without relying upon the force sustaining capability of the seat adjusting mechanism.

The embodiments of the invention in which an exclusive property or privilege is claimed are defined as follows:

1. In combination with a longitudinally adjustable vehicle seat mounted on a vehicle floor, a seat belt anchorage comprising:
- a member connected to the vehicle floor and having walls extending along the path of longitudinal seat adjusting movement;
- first and second wedge members normally longitudinally slidable relative the walls of the member and having associated ramp means by which movement of the wedge members toward one another moves the wedge members into locking engagement with the walls of the member to thereby lock the wedge members against longitudinal movement relative the walls of the member;
- means operatively connecting the seat belt with one of the wedge members so that an occupant restraint load imposed upon the seat belt induces longitudinal movement of the one wedge member toward the other to move the wedge members into locking engagement with the walls of the member whereby the seat belt is fixed relative to the member and the occupant restraint load is transmitted through the member to the vehicle floor; and
- means operatively connecting the seat with both the first and second wedge members so that adjusting movement of the seat in either direction will move one of the wedge members longitudinally away from the other wedge member to establish non-locking positions of the wedge members relative the member to enable longitudinal adjusting movement of the wedge members and the seat belt so that the seat belt is always carried at a selected position relative to the vehicle seat notwithstanding adjustment of the seat relative the vehicle floor.

2. In combination with a longitudinally adjustable vehicle seat mounted on a vehicle floor, a seat belt anchorage comprising:
- a member connected to the vehicle floor and having spaced apart opposed facing walls extending along the path of longitudinal seat adjusting movement;
- first and second wedge members longitudinally slidable within the walls of the member and having mating ramp surfaces by which movement of one of the wedge members toward the other spreads the wedge members into locking engagement with the walls of the member to thereby lock the wedge members against longitudinal movement within the walls of the member;
- means acting between the wedge members and normally establishing the wedge members in non-locking positions relative the walls of the member to enable longitudinal adjusting movement of the wedge members relative the walls of the member;
- means operatively connecting the seat belt with one of the wedge members so that an occupant restraint load imposed upon the seat belt induces longitudinal movement of the one wedge member to spread the wedge members into locking engagement with the walls of the member whereby the seat belt is fixed relative to the member and the occupant restraint load is transmitted through the member to the vehicle floor; and
- means operatively connecting the seat with both the first and second wedge members so that adjusting movement of the seat in either direction will move one of the wedge members longitudinally away from the other wedge member to establish non-locking positions of the wedge members relative the member to enable longitudinal adjusting movement wedge members and the seat belt so that the seat belt is always carried at a selected position relative to the vehicle seat notwithstanding adjustment of the seat relative the vehicle floor.

3. In combination with a longitudinally adjustable vehicle seat mounted on a vehicle floor, a seat belt anchorage comprising:
- a rectangular channel member connected to the vehicle floor and having opposed facing spaced apart walls extending along the path of longitudinal seat adjusting movement;
- forward and rearward wedge members longitudinally slidable within the walls of the channel member and having mating ramp surfaces by which forward movement of the rearward wedge members toward the forward wedge member spreads the wedge members into locking engagement with the walls of the channel member to thereby lock the wedge members against longitudinal movement within the walls of the channel member;
- means operatively connecting the seat belt with the rearward wedge member so that an occupant restraint load imposed upon the seat belt induces forward longitudinal movement of the rearward wedge member to spread the wedge members into locking engagement with the walls of the channel member whereby the seat belt is fixed relative to the channel member and the occupant restraint load is transmitted through the channel member to the vehicle floor; and
- lost motion correcting means selectively connecting the seat with the forward wedge members upon forward seat adjusting movement and with the rearward wedge member upon rearward seat adjusting movement to effectively establish the wedge members in non-locking positions relative the channel member and enable longitudinal adjusting movement of the wedge members and the seat belt so that the seat belt is always carried at a selected position relative to the vehicle seat notwithstanding adjustment of the seat relative the vehicle floor.

* * * * *